May 5, 1953 J. R. HOLLINS 2,637,804
VEHICLE LAMP WITH LENS AND REFLECTOR MEANS
Filed Feb. 9, 1951
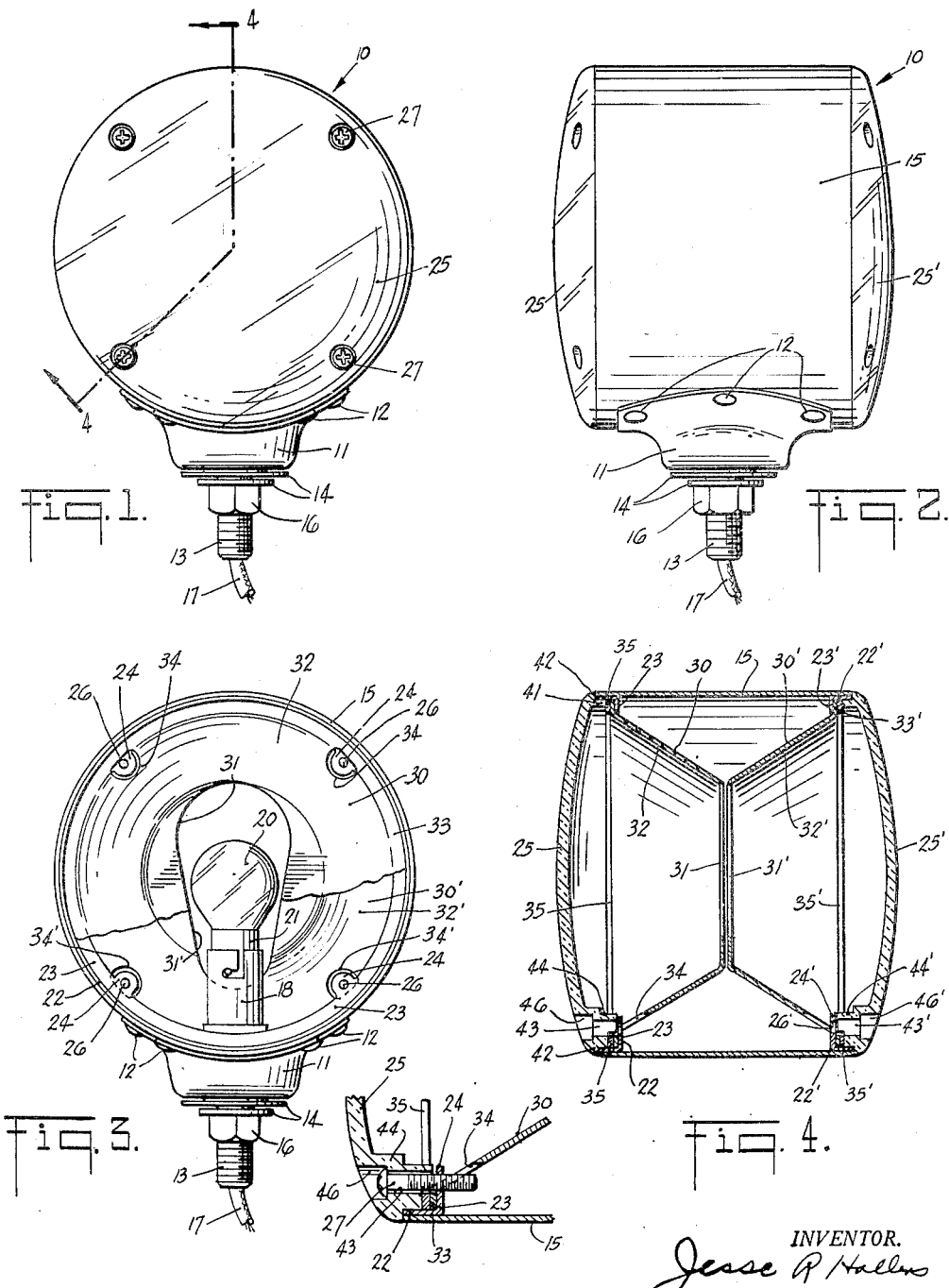

Patented May 5, 1953

2,637,804

UNITED STATES PATENT OFFICE 2,637,804

VEHICLE LAMP WITH LENS AND REFLECTOR MEANS

Jesse R. Hollins, Brooklyn, N. Y.

Application February 9, 1951, Serial No. 210,190

3 Claims. (Cl. 240—41.5)

This invention relates to lamps, especially vehicle lamps, and more particularly, to a novel assembly of a lamp casing, reflector and lens.

Vehicle lamps generally include a casing or housing having an open front and formed with a seating surface for a reflector. The latter usually has a peripheral rim engaging a seating flange on the casing. A gasket is placed against the reflector rim, overlying the same, and the assembly is completed by securing the lens to the front end of the casing.

Securement of the lens to the casing compresses the gasket against the reflector rim and the latter against the casing flange. The reflector and gasket are thus held in position by friction and compression, with the gasket sometimes having apertures alignable with the bolts or screws securing the lens to the casing.

Assembly of such lamps is complicated by the necessity of holding the reflector and gasket in proper concentric position in the casing while the lens is positioned and the holding screws inserted and tightened. This factor introduces a relatively expensive time lag in the operation of assembling the lamp, which increases the initial cost of the lamp unit.

In accordance with the present invention, proper positioning of the reflector and gasket in the casing is automatically maintained and assembly of the lamp is greatly expedited. To this end, the casing is formed with a seating flange for the peripheral rim of the reflector, and this flange, which is ring shaped and of angular configuration, is spot welded to the inner periphery of the free edge or edges of said casing, and has apertured projections or ears arranged to receive the holding screws for the lens sealing the casing. The reflector, which is substantially frusto-conical in shape, has openings in its rim and side walls to telescope over these ears. This definitely locates and maintains the reflector properly positioned and centered in the casing.

The gasket is relatively narrow and lies on the seating flange in such manner as to clear the screw receiving apertured ears. The seating flange is recessed relative to the marginal end of the casing, forming an angular recess for the gasket. The lens, which is of translucent plastic or glass, has bosses on its inner surface adjacent its periphery, and these bosses are aligned with the ears and fit closely in the openings or notches in the reflector. The bosses are apertured to receive the lens holding screws.

This construction allows simple and rapid location of the reflector and gasket in the casing, and the assembly is maintained in accurate alignment by the interlock between the ears and the reflector, and between the latter and the bosses on the lens.

For an understanding of the invention principles, reference is made to the following description of a typical embodiment thereof as illustrated in the accompanying drawing. In the drawing:

Fig. 1 is a front elevation view of a double vehicle marker lamp embodying the invention;

Fig. 2 is a side elevation view of the marker lamp;

Fig. 3 is a front elevation view of the lamp with lens and gasket removed and one reflector partly broken away;

Fig. 4 is a transverse sectional view on the line 4—4 of Fig. 1; and

Fig. 5 is an enlarged partial sectional view corresponding to a part of Fig. 4.

Referring to the drawing, the double marker lamp 10 includes a substantially cylindrical casing 15 having a mounting yoke or support 11 secured thereto in any suitable manner, rivets 12 being illustrated by way of example. A threaded nipple 13 projects from yoke 11 for insertion through an aperture in a fender, side wall or the like, whereby lamp 10 can be secured in position by washers 14 clamped in place by a nut 16 threaded on nipple 13.

A wire 17 extends through nipple 13 and is electrically connected to one terminal of a lamp socket 18 receiving a bulb 20 having a bayonet type base 21 such as commonly provided on vehicle type lamp bulbs. The other terminal of base 18 is customarily grounded. Wire 17 extends to a suitable circuit controller.

This illustrated marker lamp 10 is of the double facing type having a pair of lenses 25, 25' at opposite ends. These lenses may be the same color, or the forward lens may be clear or amber and the rear lens red. A pair of reflectors 30, 30' are mounted in back-to-back relation, having their bases suitably apertured, as at 31, 31' to accommodate bulb 20. Thereby, a single bulb 20 illumines both lenses 25, 25'.

As both reflector, gasket and lens assemblies are identical, only one will be described in detail, the other of each pair being designated by the prime (') of each reference character. Casing 15 has an angular cross-section ring 22 spot welded or otherwise secured within its forward end. The radial flange 23 of ring 22 has inwardly projecting, circumferentially spaced radial ears or projections 24 each formed with a threaded aperture 26 arranged to receive the screws 27 for securing lens 25 to casing 15.

Flange 23 acts as a seat for reflector 30, which has a frusto-conical wall 32 terminating in a flat radial rim 33 seating on flange 23. The inner margin of rim 33 and the adjacent portion of wall 32 are cut away, as at 34, to fit over ears 24 when reflector 30 is moved axially into the casing 15. These cooperating cut-outs and ears serve to accurately position the reflector in the casing and hold the same positioned.

The ring 22 also serves to locate gasket 35 which overlies rim 33. Gasket 35 has an outer diameter such that it fits snugly in the seat formed by ring 22. The inner diameter of the gasket is such that the gasket lies radially outside the ears 24. Gasket 35 is positioned on rim 33 after reflector 30 is placed into casing 15.

Lens 25 is illustrated as concave, although other shapes may be used. The lens has an axially extending annular flange 41 inwardly of its peripheral margin 42, and flange 41 is of such diameter and depth that it will fit closely within ring 22, and will compress gasket 35 when margin 42 engages the outer end of the casing. The inner surface of the lens has projections or bosses 44 aligned with ears 24 and fitting closely within the cut-outs 34 in rim 33 and wall 32. These projections are apertured, as at 43, to receive screws 27 for threading into apertures 26, the apertures 43 being countersunk at their outer ends, as at 46, to receive the screw heads. When lens 25 is positioned on the casing, projections 44 engaging in cut-outs 34 maintain accurate positioning of the several lamp elements.

The lamp 10 is easily and quickly assembled. Reflector 30 is dropped into casing 15 with cut-outs 34 slipping over ears 24, and its central aperture 31 bounding bulb 20. Gasket 35 is then sealed against rim 33. Lens 25 is then inserted with projections 44 guided by cut-outs 34. The screws 27 can then be quickly seated and driven home due to the accurate alignment of parts.

While a specific embodiment of the invention has been shown and described in detail to illustrate the application of the principles thereof, it should be understood that the invention may be otherwise embodied without departing from such principles.

What is claimed is:

1. A vehicle lamp comprising, in combination, a substantially cylindrical casing having an open end, a radially extending flange within the casing adjacent such end, said flange having radially inwardly projecting ears apertured to receive lens holding fasteners, a substantially frusto-conical reflector receivable within said casing and having a peripheral rim seating on said flange, said rim and wall of the reflector having cut-outs alignable with said ears for locating said reflector in interlocked relation with the casing, and a lens fitting such casing end and having projections engageable with at least a portion of the wall surface defining the reflector cut-outs, said projections having apertures aligned with the ear apertures to receive lens fastening means.

2. A vehicle lamp comprising, in combination, a substantially cylindrical casing having an open end, a radially extending flange within the casing adjacent such end, said flange having radially inwardly projecting ears apertured to receive lens holding fasteners, a substantially frusto-conical reflector receivable within said casing and having a peripheral rim seating on said flange, said rim and wall of the reflector having cut-outs alignable with said ears for locating said reflector in interlocked relation with the casing, an annular gasket seated on said rim and lying outside said ears, and a lens fitting such casing end and having projections engageable with at least a portion of the wall surface defining the reflector cut-outs, said projections having apertures aligned with the ear apertures to receive lens fastening means, said lens having a seating surface engaging said gasket.

3. A vehicle lamp comprising, in combination, a substantially cylindrical casing having an open end, an angular cross-section ring within said casing adjacent said end and having a circumferential flange secured to the casing and a radial flange having radially inwardly projecting ears apertured to receive lens holding fasteners, a substantially frusto-conical reflector receivable within said casing and having a peripheral rim seating on said radial flange, said rim and wall having cut-outs alignable with said ears for locating said reflector in interlocked relation with the casing, an annular gasket seated on said rim within the circumferential flange of said ring and lying outside said ears, and a lens having a circumferential flange fitting within said ring and engaging said gasket, and having projections engageable with at least a portion of the wall surface defining the reflector cut-outs, said projections having apertures aligned with the ear apertures to receive lens fastening means.

JESSE R. HOLLINS.

References Cited in the file of this patent

UNITED STATES PATENTS

| Number | Name | Date |
| --- | --- | --- |
| 981,044 | Welles | Jan. 10, 1911 |
| 1,611,938 | Neuner | Dec. 28, 1926 |
| 1,928,112 | Michel | Sept. 26, 1933 |
| 2,058,546 | Haines | Oct. 27, 1936 |
| 2,307,739 | Bahr | Jan. 12, 1943 |